US012352181B2

(12) United States Patent
Ramakrishnan et al.

(10) Patent No.: US 12,352,181 B2
(45) Date of Patent: Jul. 8, 2025

(54) TURBINE AIRFOILS

(71) Applicant: General Electric Company, Schenectady, NY (US)

(72) Inventors: Kishore Ramakrishnan, Rexford, NY (US); Nikolai N. Pastouchenko, Latham, NY (US); Trevor Howard Wood, Clifton Park, NY (US); Thomas William Vandeputte, Scotia, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/161,122

(22) Filed: Jan. 30, 2023

(65) Prior Publication Data

US 2024/0254883 A1 Aug. 1, 2024

(51) Int. Cl.
*F01D 5/14* (2006.01)

(52) U.S. Cl.
CPC ........ *F01D 5/142* (2013.01); *F05D 2240/121* (2013.01); *F05D 2240/122* (2013.01); *F05D 2250/713* (2013.01); *F05D 2260/96* (2013.01)

(58) Field of Classification Search
CPC ............... F01D 5/142; F05D 2240/121; F05D 2240/122; F05D 2250/713; F05D 2260/96
See application file for complete search history.

(56) References Cited

U.S. PATENT DOCUMENTS 2,746,672 A 5/1956 Doll, Jr. et al.
4,419,045 A 12/1983 Andre et al.
4,534,526 A 8/1985 Metzger et al.
4,709,882 A 12/1987 Galbraith
4,830,315 A 5/1989 Presz, Jr. et al.
(Continued)

FOREIGN PATENT DOCUMENTS

GB 1319849 A 6/1973

OTHER PUBLICATIONS

Carney et al., Weight Assessment for Fuselage Shielding on Aircraft with Open-Rotor Engines and Composite Blade Loss, NASA/TM-2013-216582, 2013, 33 Pages.
(Continued)

*Primary Examiner* — Jacob M Amick
*Assistant Examiner* — Charles J Brauch
(74) *Attorney, Agent, or Firm* — Dority & Manning, P.A.

(57) ABSTRACT

A turbine airfoil is provided. The turbine airfoil defines a chord line, a spanwise direction, a span along the spanwise direction, and a midpoint along the spanwise direction. The turbine airfoil includes a pressure side and a suction side. The pressure side and the suction side intersecting at a leading edge and a trailing edge. The turbine airfoil further includes a root and a tip at opposing ends along the spanwise direction. In addition, the turbine airfoil defines a leading edge reference line extending from where the leading edge meets the root to where the leading edge meets the tip and a trailing edge reference line extending from where the trailing edge meets the root to where the trailing edge meets the tip. The turbine airfoil includes a lobe positioned at the leading edge or the trailing edge and defines a maximum axially height relative to the leading edge reference line or the trailing edge reference line. The maximum axial height being equal to at least five percent of the chord line of the turbine airfoil.

20 Claims, 8 Drawing Sheets

(56) References Cited

U.S. PATENT DOCUMENTS

| | | | |
|---|---|---|---|
| 4,917,336 | A | 4/1990 | Jacobs et al. |
| 4,934,825 | A | 6/1990 | Martin |
| 4,976,102 | A | 12/1990 | Taylor |
| 5,148,402 | A | 9/1992 | Magliozzi et al. |
| 5,156,353 | A | 10/1992 | Gliebe et al. |
| 5,190,441 | A | 3/1993 | Murphy et al. |
| 5,197,855 | A | 3/1993 | Magliozzi et al. |
| 5,259,187 | A | 11/1993 | Dunbar et al. |
| 5,789,678 | A | 8/1998 | Pla |
| 6,341,747 | B1 | 1/2002 | Schmidt et al. |
| 6,546,734 | B2 | 4/2003 | Antoine et al. |
| 6,905,307 | B2 | 6/2005 | Kawarada et al. |
| 7,484,937 | B2 | 2/2009 | Johann |
| 7,578,132 | B2 | 8/2009 | Webster |
| 7,665,963 | B2 | 2/2010 | Bogue et al. |
| 8,011,613 | B2 | 9/2011 | Belleville |
| 8,083,482 | B2 | 12/2011 | Serven et al. |
| 8,087,607 | B2 | 1/2012 | Moore et al. |
| 8,186,617 | B2 | 5/2012 | Llamas Sandin |
| 8,196,860 | B2 | 6/2012 | Gall et al. |
| 8,210,798 | B2 | 7/2012 | Stern |
| 8,220,586 | B2 | 7/2012 | Todorovic |
| 8,240,609 | B2 | 8/2012 | Parazzoli et al. |
| 8,350,398 | B2 | 1/2013 | Butt |
| 8,550,397 | B2 | 10/2013 | Verde Preckler et al. |
| 8,690,106 | B1 | 4/2014 | Reissig |
| 8,794,926 | B2 | 8/2014 | Routier |
| 8,944,774 | B2 | 2/2015 | Bielek |
| 8,967,967 | B2 | 3/2015 | Stretton et al. |
| 9,057,329 | B2 | 6/2015 | Weir et al. |
| 9,102,397 | B2 | 8/2015 | Wood |
| 9,193,451 | B2 | 11/2015 | Salyer |
| 9,527,578 | B2 | 12/2016 | Towkan |
| 9,540,094 | B2 | 1/2017 | Negulescu et al. |
| 9,725,155 | B2 | 8/2017 | Miller et al. |
| 9,745,051 | B2 | 8/2017 | Tantot et al. |
| 9,758,254 | B2 | 9/2017 | Moore et al. |
| 9,759,160 | B2 | 9/2017 | Sankrithi et al. |
| 9,856,745 | B2 | 1/2018 | Ali |
| 9,890,657 | B2 | 2/2018 | Ali |
| 10,118,710 | B2 | 11/2018 | Derrez et al. |
| 10,131,441 | B2 | 11/2018 | Edwards et al. |
| 10,202,865 | B2 | 2/2019 | Breeze-Stringfellow et al. |
| 10,358,926 | B2 | 7/2019 | Tweedt |
| 10,370,086 | B2 | 8/2019 | Vion et al. |
| 10,378,452 | B1 | 8/2019 | Barmichev et al. |
| 10,399,664 | B2 | 9/2019 | Bowden et al. |
| 10,399,689 | B2 | 9/2019 | Darnell et al. |
| 10,414,486 | B2 | 9/2019 | Wood et al. |
| 10,414,497 | B2 | 9/2019 | VVelez De Mendizabal Alonso et al. |
| 10,465,520 | B2 | 11/2019 | Vandeputte |
| 10,669,881 | B2 | 6/2020 | Breeze-Stringfellow et al. |
| 10,843,807 | B2 | 11/2020 | Bevirit et al. |
| 10,909,962 | B2 | 2/2021 | Goto et al. |
| 11,014,682 | B2 | 5/2021 | Colavincenzo et al. |
| 2008/0245925 | A1 | 10/2008 | Udall |
| 2012/0195739 | A1 | 8/2012 | Kingan |
| 2013/0071254 | A1 | 3/2013 | Mitlin et al. |
| 2013/0115083 | A1 | 5/2013 | Vuillemin |
| 2013/0327014 | A1 | 12/2013 | Moulebhar |
| 2014/0248116 | A1 | 9/2014 | Ali |
| 2015/0291276 | A1 | 10/2015 | Zatorski et al. |
| 2015/0344127 | A1 | 12/2015 | Wood et al. |
| 2016/0010487 | A1 | 1/2016 | Breeze-Stringfellow et al. |
| 2016/0333729 | A1 | 11/2016 | Miller et al. |
| 2016/0333734 | A1 | 11/2016 | Bowden et al. |
| 2016/0368592 | A1 | 12/2016 | Szymandera |
| 2017/0002688 | A1 | 1/2017 | Beutin et al. |
| 2017/0102006 | A1 | 4/2017 | Miller et al. |
| 2017/0159571 | A1 | 6/2017 | Sidelkovskiy |
| 2017/0225773 | A1 | 8/2017 | Wood et al. |
| 2017/0356654 | A1 | 12/2017 | Locke et al. |
| 2018/0023397 | A1 | 1/2018 | Vandeputte |
| 2018/0065727 | A1 | 3/2018 | Gruber et al. |
| 2018/0079492 | A1 | 3/2018 | Seidel et al. |
| 2018/0127084 | A1 | 5/2018 | Tajan et al. |
| 2018/0354634 | A1 | 12/2018 | Jodet et al. |
| 2020/0003073 | A1 | 1/2020 | Karapurath et al. |
| 2020/0308968 | A1 | 10/2020 | Eryilki et al. |
| 2020/0309045 | A1 | 10/2020 | Gomez |
| 2020/0332663 | A1 * | 10/2020 | Propheter-Hinckley .................... F01D 5/186 |
| 2021/0108523 | A1 | 4/2021 | Miller et al. |
| 2021/0108576 | A1 | 4/2021 | Adibhatla et al. |
| 2021/0171212 | A1 | 6/2021 | Keller et al. |

OTHER PUBLICATIONS

Gazzaniga et al., Wind Tunnel Performance Results of Swiri Recovery Vanesas Tested with an Advanced High Speed Propeller, AIAA-92-3770, 28th Joint Propulsion Conference Exhibit, Nashville TN, Jul. 6-8, 1992, 42 Pages.

Giacche et al., Acoustic Optimization of Ultra-Low Count Bypass Outlet Guide Vanes, AIAA-2013-2295, Aerospace Research Central, Session: Turbomachinery and Core Noise V, 2013. (Abstract Only) Retrieved Feb. 28, 2022 from https://arc.aiaa.org/doi/10.2514/6.2013-2295.

Hultgren, A Comparison of Combustor-Noise Models, AIAA-2012-2087, 18th AIAA/CEAS Aeroacoustics Conference (33rd AIAA Aeroacoustics Conference) Colorado Springs, CO, Jun. 4-6, 2012, 27 Pages. (Abstract Only) https://arc.aiaa.org/doi/10.2514/6.2012-2087.

Open Rotor Engine and Installation, European Aviation Safety Agency, Notice of Proposed Amendment 2015-22, RMT.0384 (MDM.092) Dec. 21, 2015, 96 Pages.

Thirmurthy et al., Optimized SGT-A35 (GT61) for Improved Emissions and Enhanced Efficiency Across the Load Range, ASME GT-2019-90610, Proceedings of the ASME Turbo Expo 2019: Turbomachinery Technical Conference and Exposition, vol. 9, Phoenix, Arizona, Jun. 17-21, 2019. (Abstract Only) Retrieved on Feb. 28, 2022 from https://asmedigitalcollection.asme.org/GT/proceedings-abstract/GT2019/58721/V009T27A018/1067246.

* cited by examiner

TURBINE AIRFOILS

FIELD

The present subject matter relates generally to airfoils, and more particularly, to turbine airfoils for a gas turbine engine.

BACKGROUND

A gas turbine engine generally includes a fan and a turbomachine arranged in flow communication with one another. Additionally, the turbomachine of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
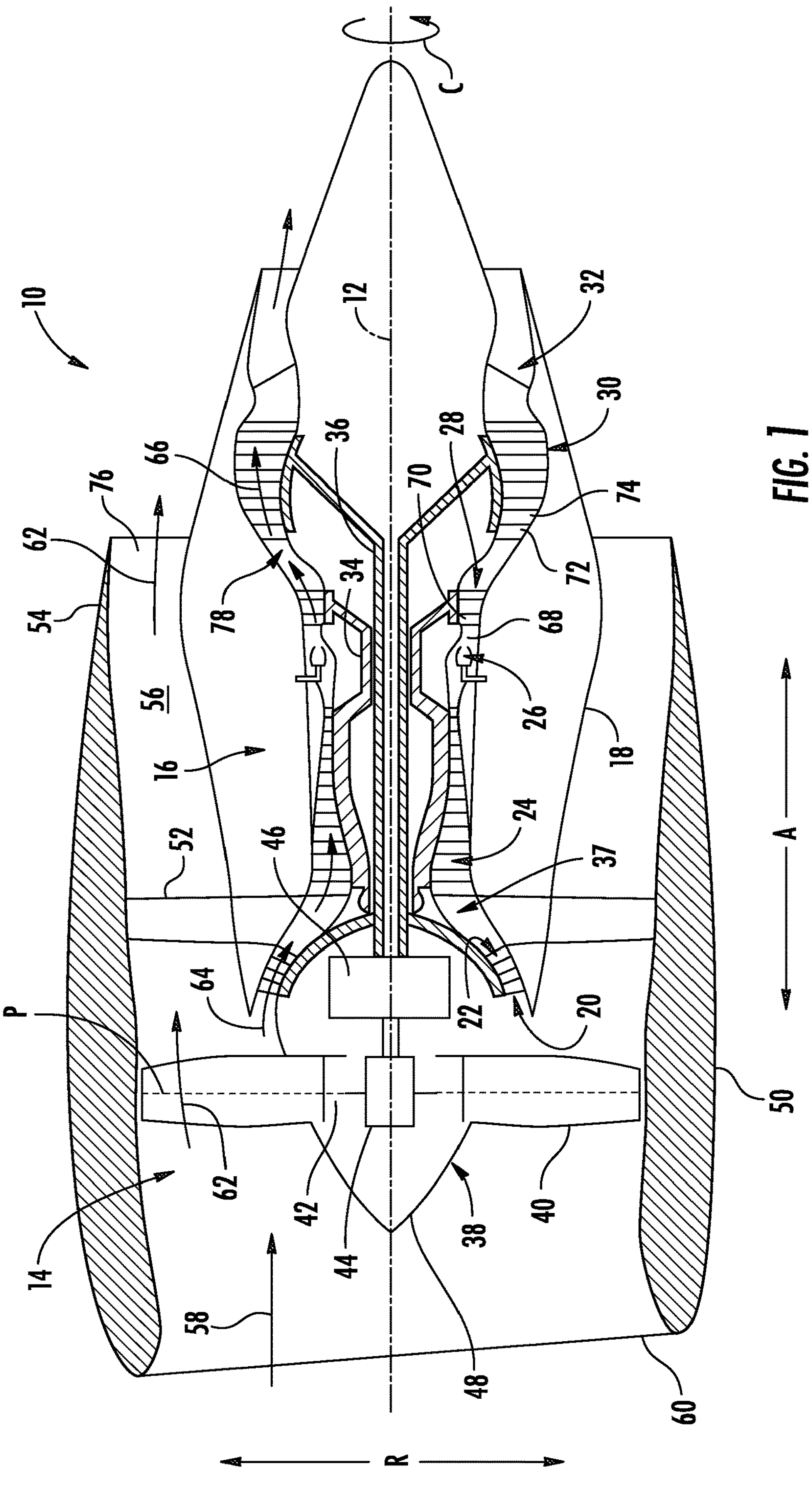
FIG. 1 is a schematic cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

A turbine airfoil for a gas turbine engine is generally provided. The turbine airfoil may define a spanwise direction and a span along the spanwise direction. Further, the turbine airfoil includes a pressure side and a suction side, the pressure side and the suction side intersecting at a leading edge and a trailing edge. The turbine airfoil additional includes a root and a tip at opposing ends of the spanwise direction. The turbine airfoil includes a lobe positioned at the leading edge or the trailing edge.

The embodiment generally described herein enables the turbine airfoil to reduce the generation and/or the transmission of noise of a gas turbine engine.

Referring now to the drawings, wherein identical numerals indicate the same elements throughout the figures, is a schematic cross-sectional view of a gas turbine engine 10 in accordance with an exemplary embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by a rotatable front hub 48 of the fan section 14 (sometimes also referred to as a "spinner"). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
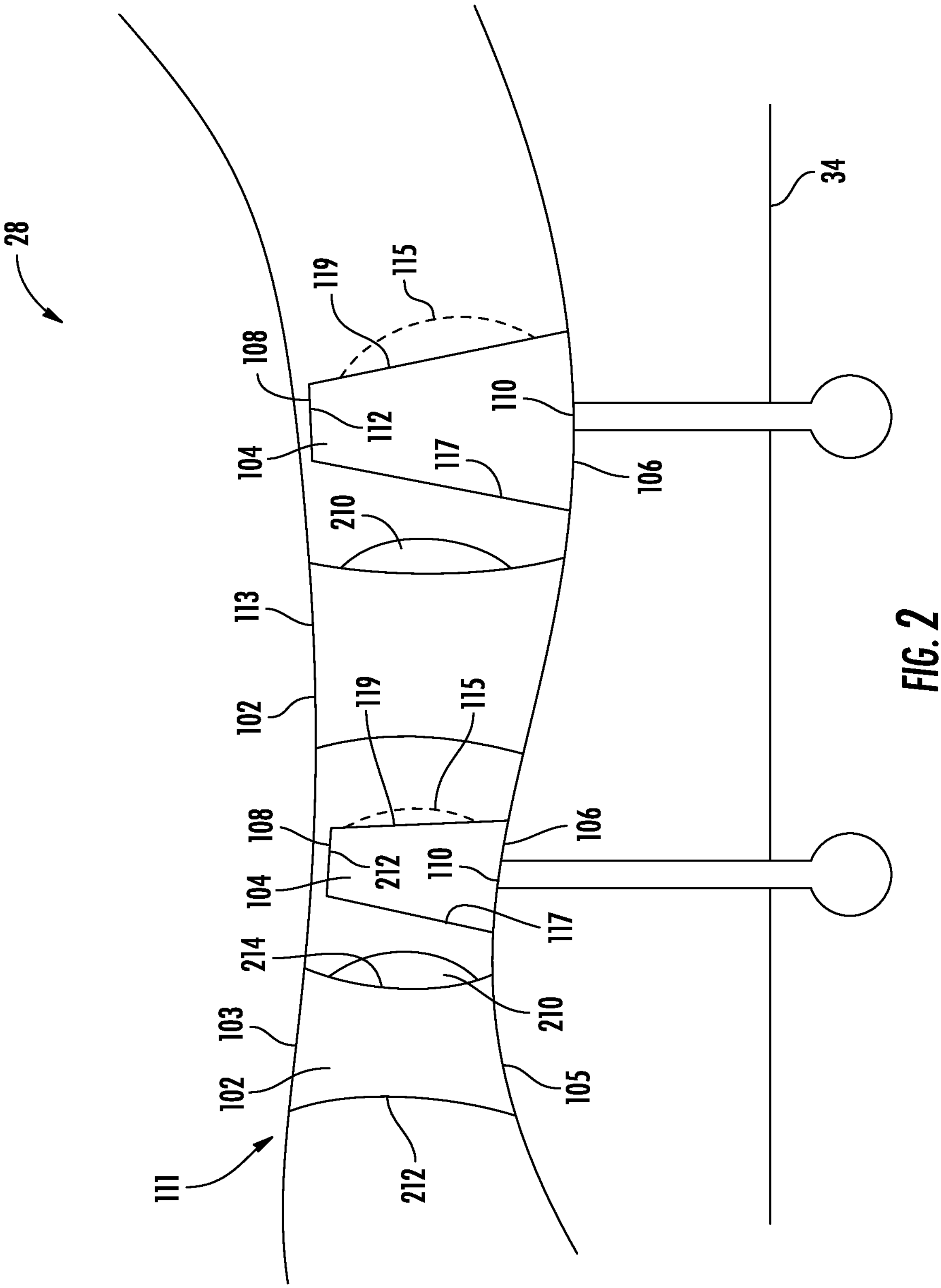
FIG. 2 is a cross-sectional view of an HP turbine in accordance with an exemplary aspect of the present disclosure.

Referring now to FIG. 2, a cross-sectional view of the HP turbine 28 in accordance with an exemplary aspect of the present disclosure is provided. The HP turbine 28 includes a plurality of turbine airfoils. More specifically, the HP turbine 28 includes a plurality of HP stator vanes 102 and a plurality of HP rotor blades 104. Each HP rotor blade 104 of the plurality of HP rotor blades 104 extends along a spanwise direction between a root 106 and a tip 108. The HP rotor blades 104 each further include a leading edge 117 and a trailing edge 119. The plurality of HP rotor blades 104 are coupled to the HP shaft 34 and rotate with the HP shaft 34. The plurality of HP rotor blades 104 includes a radially inward platform 110 located at the root 106.

As with the HP rotor blades 104, the HP stator vanes 102 each extend along a spanwise direction between a root 105 and a tip 103. The HP stator vanes 102 each further include a leading edge 212 and a trailing edge 214. Further, in the embodiment depicted, the plurality of HP stator vanes 102 each include a lobe 210 positioned at the trailing edge 214 and configured to reduce indirect combustion noise of the engine by reducing an acceleration of the combustion gases 66 that flow through the HP turbine 28 past the trailing edge 214 of each of the plurality of HP stator vanes 102 during operation of the gas turbine engine 10 (FIG. 1). Additionally, the lobes 210 of the plurality of HP stator vanes 102 are configured to smoothly guide the flow of combustion gases 66 to pass through the HP rotor blades 104 during operation of the gas turbine engine 10.

Notably, for the embodiment depicted, the HP stator vanes 102 includes a first stage 111 of HP stator vanes 102, also referred to as a stage one turbine nozzle 111, and a second stage 113 of HP stator vanes 102 also referred to as a stage two turbine nozzle 113.

It should be appreciated that the depicted HP turbine 28 is provided by way of example only and that in alternative exemplary embodiments of the HP turbine 28, the HP turbine 28 may be configured in any suitable manner. For example, as is depicted in phantom, in other embodiments, the plurality of HP rotor blades 104 may each also include a lobe 115 at respective trailing edges 119.

Figure 3:
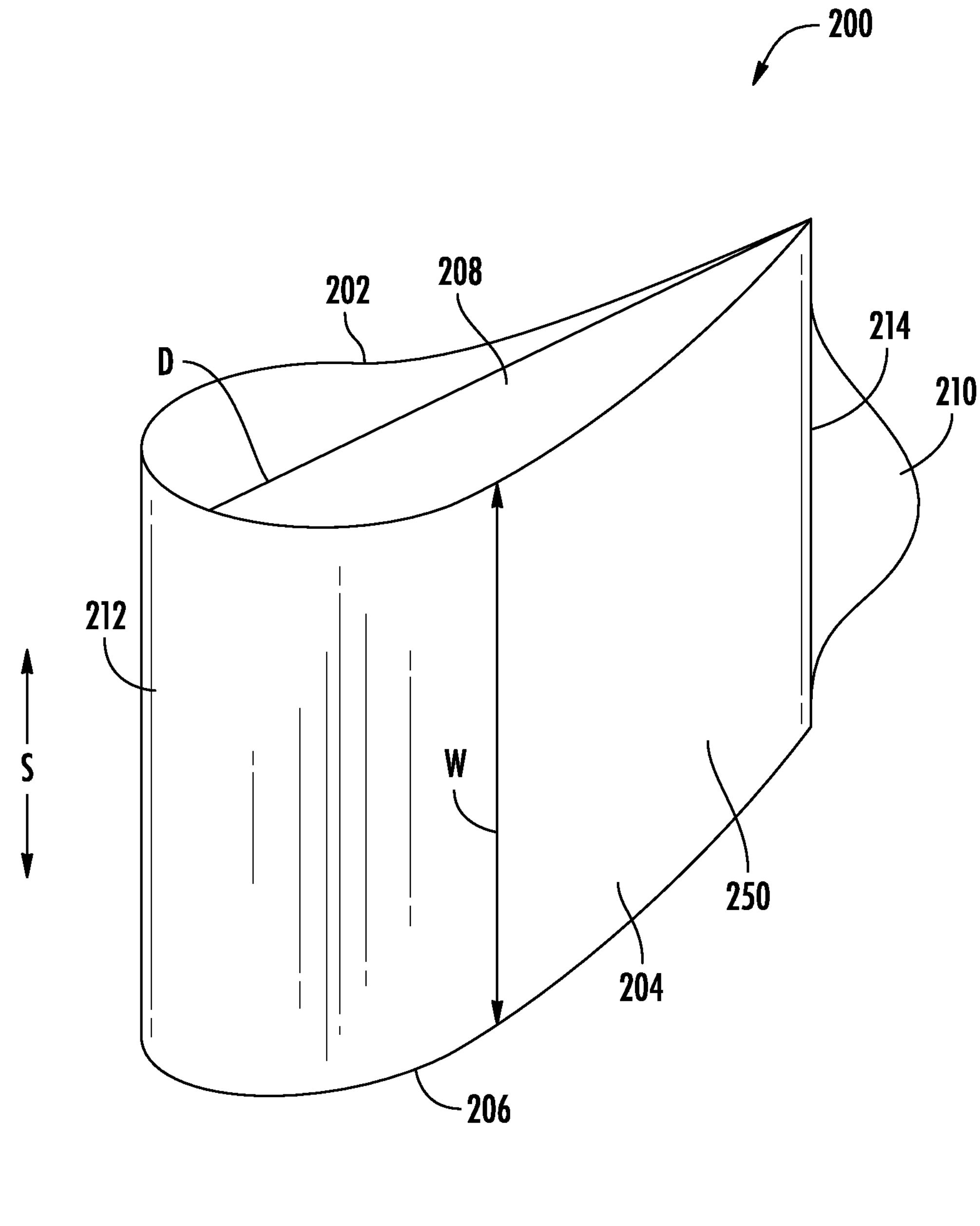
FIG. 3 is a schematic view of a turbine airfoil in accordance with an exemplary aspect of the present disclosure

Referring now to FIG. 3, a schematic view of a turbine airfoil 200 in accordance with an exemplary aspect of the present disclosure is provided. The exemplary turbine airfoil 200 defines a chord line D, a spanwise direction S, and a span W along the spanwise direction S. More specifically the turbine airfoil 200 includes a body portion 250, a pressure side 202, a suction side 204, a root 206, a tip 208, and lobe 210. The pressure side 202 and the suction side 204 intersect at a leading edge 212 and a trailing edge 214. In addition, the chord line D may be generally defined as a line extending between leading edge 212 and trailing edge 214, and the term “chordwise direction” may generally refer to the relative position along the chord line D. The root 206 and the tip 208 are at opposing ends of the turbine airfoil 200 along the spanwise direction S. The lobe 210 is positioned at the trailing edge 214 of the turbine airfoil 200, as will be explained in more detail below.

The exemplary turbine airfoil 200 may be configured as a blade or a vane of a turbine of a gas turbine engine. For example, the turbine airfoil of FIG. 3 is configured as an HP stator vane 102, such as one or more of the plurality of HP stator vanes 102 of the HP turbine 28 of FIG. 2. In such a manner, it will be appreciated that the lobe 210 of the turbine airfoil 200 may be configured to reduce an acceleration of a flow of combustion gases 66 (FIG. 1) flowing past the trailing edge 214 of the HP stator vanes 102 in the HP turbine 28.

It should be appreciated that in alternative exemplary embodiments the turbine airfoil 200 may be incorporated into the gas turbine engine, such as gas turbine engine 10 of FIG. 1, in alternate ways. For example, the turbine airfoil 200 may be a low pressure turbine vane or a turbine vane strut.

Figure 4:
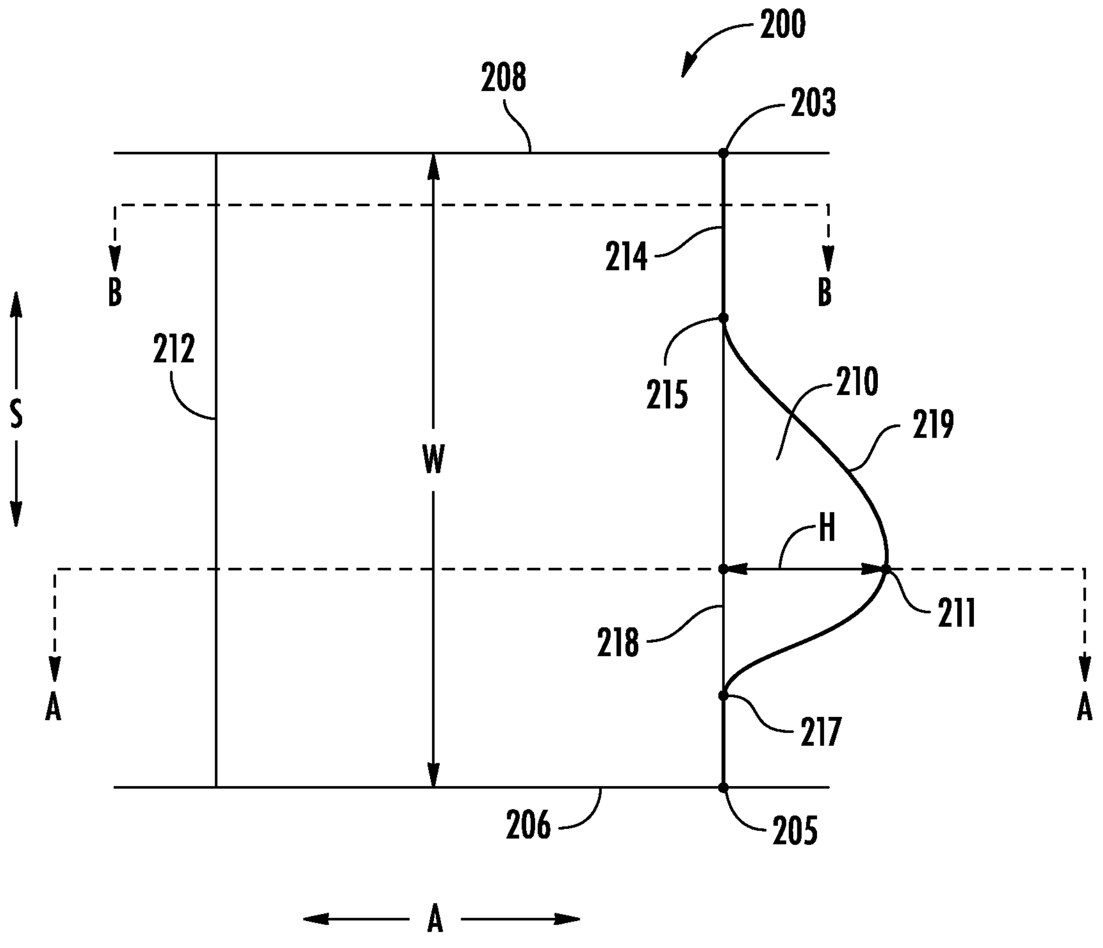
FIG. 4 is side view of the turbine airfoil of FIG. 3 in accordance with the exemplary aspect of the present disclosure.

Referring now to FIG. 4, a side view of the turbine airfoil 200 of FIG. 3 in accordance with the exemplary aspect of the present disclosure is provided. As is depicted, the lobe 210 is positioned at the trailing edge 214 and generally includes an upper inflection point 215, a lobe peak locating point 211, and a lower inflection point 217. The lobe peak locating point 211 is located radially between 20% of the span W and up to 80% of the span W. The upper inflection point 215 is located radially between the lobe peak locating point 211 and up to 90% of the span W. The lower inflection point 217 is located radially between the lobe peak locating point 211 and at least 10% of the span W. Further, the lobe peak locating point 211 of the lobe 210 defines a maximum axial height H of the lobe 210 relative to the trailing edge 214. The maximum axial height H is equal to at least 5% of a length of the chord line D (FIG. 3) of the turbine airfoil 200.

It should be appreciated that the maximum axial height H being equal to at least 5% of the length of the chord line D of the turbine airfoil 200 is provided by way of example only. For example, the maximum axial height H may be equal to at least 15% of the length of the chord line D of the turbine airfoil 200, such as at least 20%, such as at least 25%, such as up to one 100%, such as up to 90%.

In addition, the lobe 210 includes a lobe edge 219 that generally extends from a tip intersection point 203 to a root intersection point 205. The tip intersection point 203 is located at the intersection of the tip 208 of the turbine airfoil 200 and the trailing edge 214 of the turbine airfoil 200 intersect and the root intersection point 205 is located at the intersection of the root 206 of the turbine airfoil 200 and the trailing edge 214 of the turbine airfoil 200 intersect. Further, as depicted the upper inflection point 215, the lobe peak locating point 211, and the lower inflection point 217 generally define the shape (e.g., the curve) of the lobe edge 219. For example, in the exemplary embodiment depicted the lobe edge 219 is defined by a Bezier curve.

However, it should be appreciated that the shape of the lobe edge 219 is provided by way of example only, and in alternative embodiments the upper inflection point 215, the lobe peak locating point 211, and the lower inflection point 217 may define any suitable shape for the lobe edge 219. For example, the shape of the lobe edge 219 may be defined by a polynomial curve or a piece-wise cubic curve Additionally, it should be appreciated that the upper inflection point 215, the lobe peak locating point 211, and the lower inflection point 217 may be positioned in such a manner that they each define an axial offset from the trailing edge 214. Each axial offset of the upper, middle, and lower inflection points 215, 211, and 217, respectively, may in part define an axial projection of the lobe 210 relative to the trailing edge 214 of the turbine airfoil 200.

In addition, as is depicted the lobe 210 of the exemplary embodiment refers to a section of the turbine airfoil 200 along the span W between the upper inflection point 215 and the lower inflection point 217 and separated from the body portion 250 by a separation line 218. The separation line 218 is defined between the upper inflection point 215 and the lower inflection point 217. In particular, in the exemplary embodiment depicted, the separation line 218 is defined on the trailing edge 214.

It should be appreciated that the position of the lobe 210 in the exemplary embodiment depicted is provided by way of example only. In alternative exemplary embodiments the lobe 210 may be positioned at the leading edge 212. With such an embodiment, the maximum axial height H may be defined relative to the leading edge reference line L or the trailing edge reference line T.

More specifically, in the exemplary embodiment depicted the maximum axial height H of the lobe 210 is located below a midpoint of the turbine airfoil 200. It should be appreciated that the location of the maximum axial height H of the lobe 210 is provided by way of example only. For example, in alternative exemplary embodiments the maximum axial height H of the lobe 210 may be at, above, or below the midpoint of the turbine airfoil 200.

Figure 5:
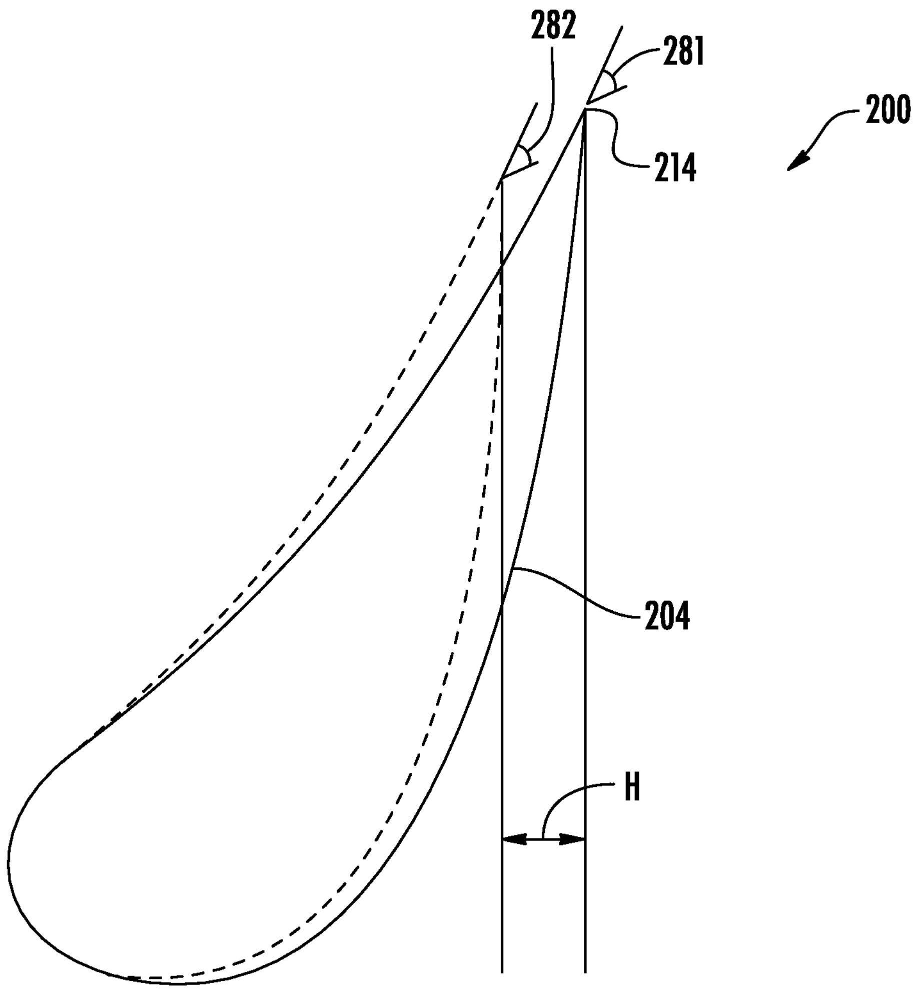
FIG. 5 is a cross-sectional view of the turbine airfoil of FIG. 4 taken along line A-A.

Referring now to FIG. 5, a cross-sectional view of the turbine airfoil 200 of FIG. 4 taken along line A-A is provided. More particularly, FIG. 5 depicts a cross-sectional view of the turbine airfoil 200 at the maximum axial height H of the lobe 210. Additionally, FIG. 5 depicts in phantom a cross sectional view of a baseline turbine airfoil 200', which may refer generally to a turbine airfoil that does not include a lobe, at a common span as the turbine airfoil 200 depicted. It should be appreciated that for the embodiment depicted, as the axial offset of the lobe 210 changes, a width of the turbine airfoil 200 changes to maintain the trailing edge flow angle 281 of the turbine airfoil 200. For example, as depicted in the exemplary embodiment, the lobe 210 changes a width of the turbine airfoil 200 such that the trailing edge flow angle 281 of the turbine airfoil 200 taken at line A-A and a trailing edge flow angle 282 of the baseline turbine airfoil 200' at the common span location are equal.

It should be appreciated that at any point along the trailing edge 214 of the turbine airfoil 200 the trailing edge flow angles 281, 282 may be the same. Additionally, it should be appreciated that the maintained trailing edge flow angle along the trailing edge 214 of the turbine airfoil 200 relative to the baseline turbine airfoil 200' at the common span location is beneficial in maintaining flow capabilities of the turbine airfoil 200.

It will be appreciated that the trailing edge flow angles 281, 282 may vary along the span of the turbine airfoils 200, 200' linearly (e.g., increasing from hub to tip or decreasing from hub to tip), or may change non-linearly.

Figure 6:
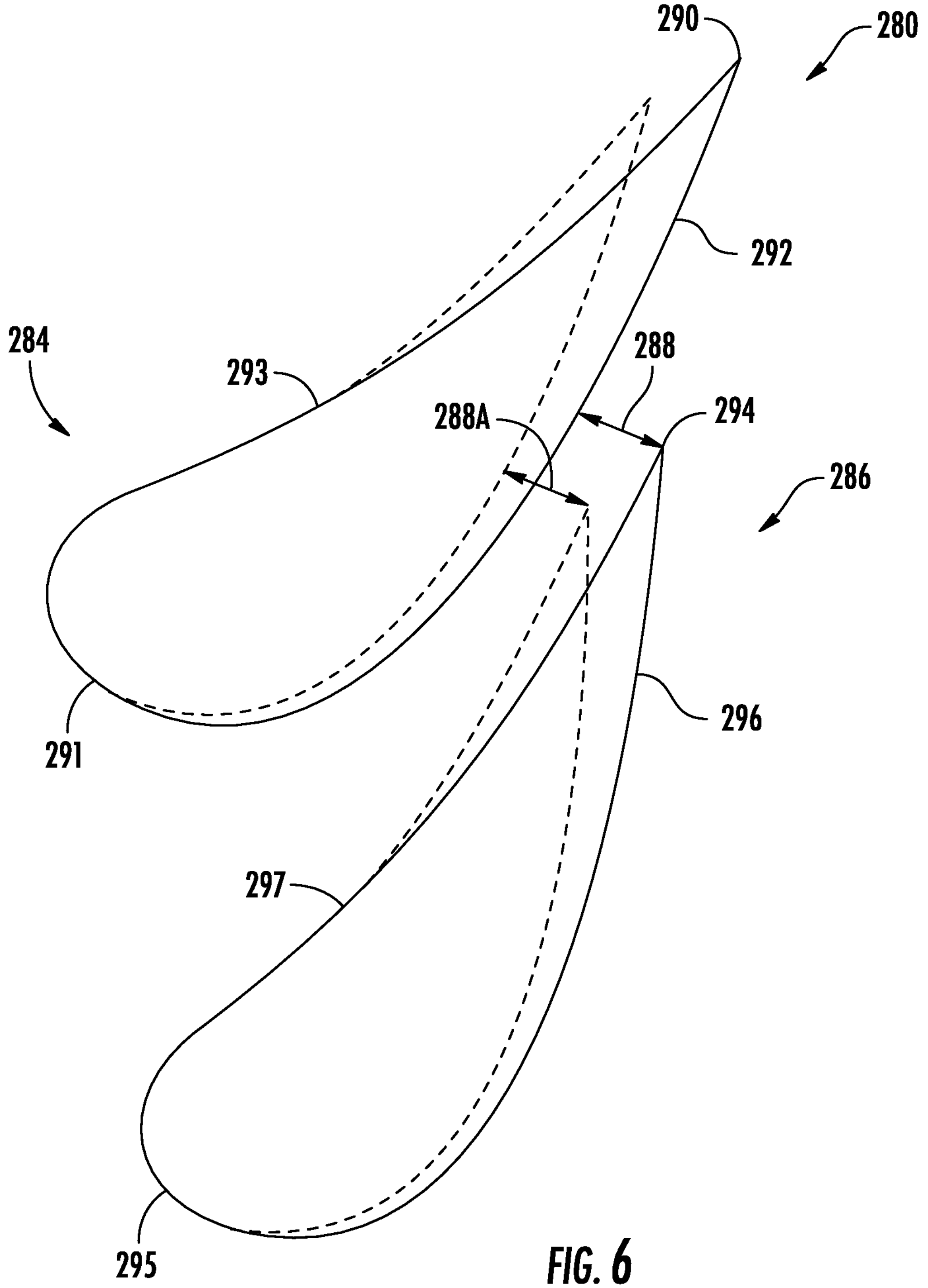
FIG. 6 is a cross-sectional view of a plurality of turbine airfoils in accordance with another exemplary aspect of the present disclosure

Referring now to FIG. 6, a cross-sectional view of a plurality of turbine airfoils 280 is provided. The plurality of turbine airfoils 280 of the exemplary embodiment includes a first turbine airfoil 284 and a second turbine airfoil 286. Both the first turbine airfoil 284 and the second turbine airfoil 286 of FIG. 6 may be configured in substantially the same manner as the exemplary turbine airfoil 200 of FIG. 5.

For example, the first turbine airfoil 284 includes a trailing edge 290 and the second turbine airfoil 286 includes a trailing edge 294. The first turbine airfoil 284 and the second turbine airfoil 286 each have a lobe (see e.g., lobe 210 of FIGS. 2 through 5) positioned at each respective trailing edge 290, 294. It should be appreciated that the lobe of the first turbine airfoil 284 and the lobe of the second turbine airfoil 286 are configured to have the same shape (e.g., an upper inflection point, a lobe peak locating point, and a lower inflection point of each respective lobe that is located in substantially the same position relative to the first turbine airfoil 284 and to the second turbine airfoil 286).

Moreover, as depicted the first turbine airfoil 284 and the second turbine airfoil 286 are shown at a lobed position, e.g., a position where each of the respective lobes is present, such as at the maximum axial height H of FIG. 4. The first turbine airfoil 284 further includes a leading edge 291, a pressure side 293, and a suction side 292. The second turbine airfoil 286 further includes a leading edge 295, a pressure side 297, and a suction side 296. Additionally, a throat width 288 is defined as the shortest distance between the trailing edge 294 of the second turbine airfoil 286 and the suction side 292 of the first turbine airfoil 284 at a given span of the first and second turbine airfoils 284, 286. For example, as depicted in FIG. 6, the throat width 288 at the span depicted (e.g., a span associated with a maximum axial height H of the lobes; see FIG. 4) is defined between the second turbine airfoil 286 at the lobed position and the first turbine airfoil 284 at the lobed position.

Additionally, it should be appreciated that the throat width 288 defined by the plurality of turbine airfoils 280 may be maintained, e.g., between each of the respective turbine airfoils 280, with respect to a baseline turbine airfoil shape at a given span location. In some embodiments, the baseline turbine airfoil shape may refer generally to the shape of a turbine airfoil, e.g., as taken from a cross-sectional view of a turbine airfoil that does not include a lobe. For example, as depicted in phantom in FIG. 6, the baseline turbine airfoil shape of the first turbine airfoil 284 and the baseline turbine airfoil shape of the second turbine airfoil 286 are taken from a common span location as the first and second turbine airfoils 284, 286, but represent airfoils without a lobe at a trailing edge. Further, as depicted in FIG. 6, a throat width 288A is shown between the baseline airfoil shape of the second turbine airfoil 286 and the baseline turbine airfoil shape of the first turbine airfoil 284. The throat width 288A and the throat width 288 may be equal such that the throat width is maintained despite the addition of the lobes.

It should be appreciated that by maintaining a throat width 288 between the plurality of turbine airfoils 280 at a given span location, such as with respect to a baseline turbine airfoil shape, the flow capabilities of the plurality of turbine airfoils 280 may be maintained.

Additionally, it should be appreciated that the plurality of turbine airfoils 280 may include any suitable number of turbine airfoils 280. For example, the plurality of turbine airfoils 280 may include up to a third turbine airfoil, such as up to a fourth turbine airfoil, such as up to a sixth turbine airfoil.

Figure 7:
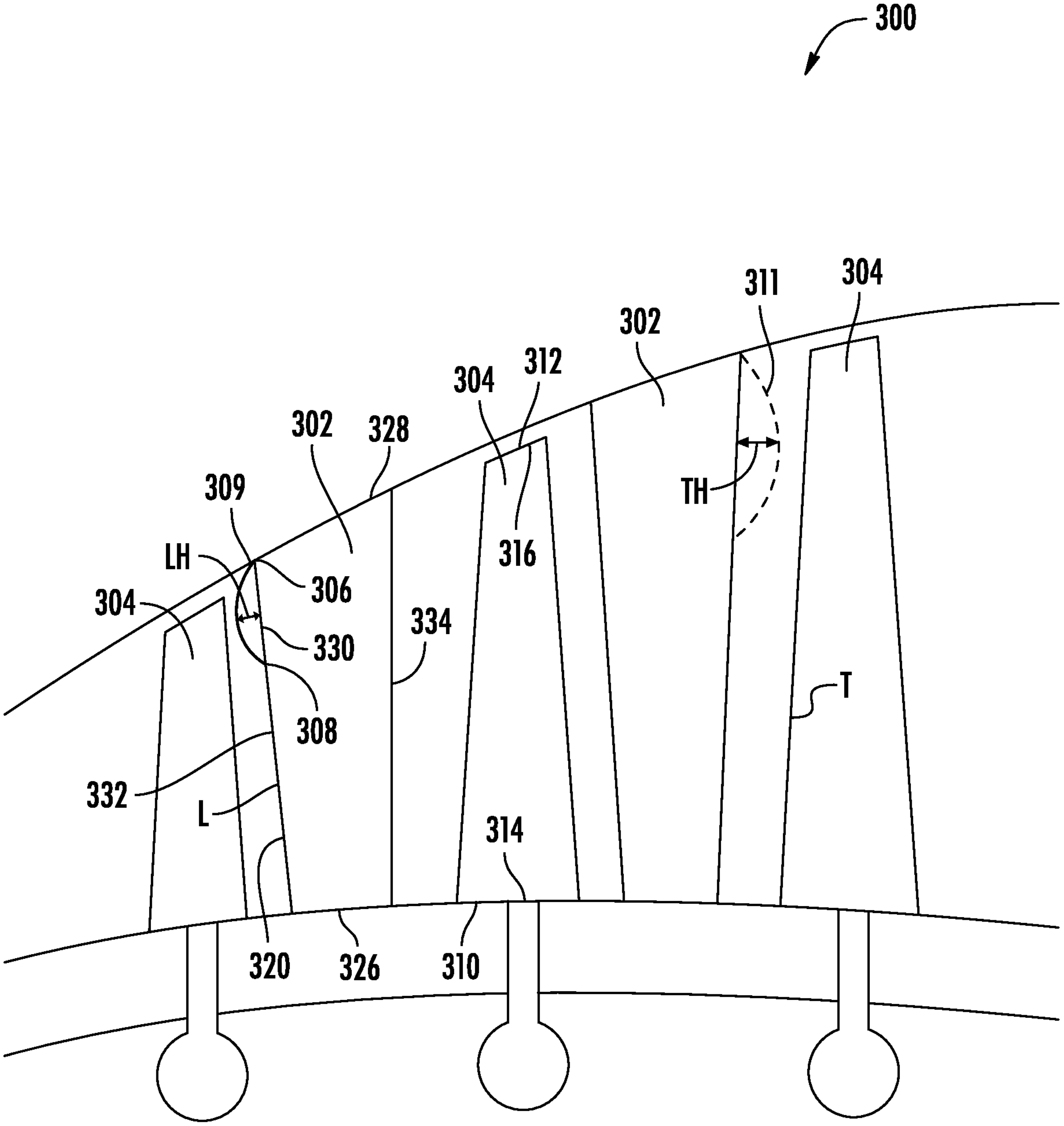
FIG. 7 is a cross-sectional view of an LP turbine in accordance with an exemplary aspect of the present disclosure.

Referring now to FIG. 7, a cross-sectional view of an LP turbine 300 in accordance with an exemplary aspect of the present disclosure is provided. The LP turbine 300 includes a plurality of LP stator vanes 302 and a plurality of LP rotor blades 304. The plurality of LP rotor blades each include a root 310 and a tip 312. The exemplary LP stator vanes 302 may be configured in substantially the same manner as the exemplary turbine airfoil 200 of FIG. 3, and accordingly, the same or similar numbers may refer to the same or similar parts.

For example, the exemplary LP stator vanes 302 of FIG. 7 generally defines a camber direction, a spanwise direction, a span along the spanwise direction, and a midpoint 315 along the spanwise direction S. Further, the LP stator vanes 302 of FIG. 7 generally includes a root 326, a tip 328, and a lobe 330 positioned at the leading edge 332 or the trailing edge 334 of the turbine airfoil 302. For the embodiment depicted, the lobe peak locating point of the lobe 330 is within an outer 25% of the span of the LP stator vanes 302. However, for the embodiment of FIG. 7 the lobe 330 is now configured to define an outer reference point 306 and an inner reference point 308 at opposing ends along the spanwise portion of the lobe 330. The outer reference point 306 may have the same meaning as the upper inflection point 215 described above with reference to FIG. 4, and the inner reference point 308 may have the same meaning as the lower inflection point 217 described above with reference to FIG. 4.

The inner reference point 308 of the lobe 330 is located at or above the midpoint 315 of the LP stator vanes 302. Additionally, the leading edge 332 or the trailing edge 334 defines a straight portion 320. The straight portion 320 extends from where the root 326 meets the leading edge 332 or the trailing edge 334 of the LP stator vanes 302 to the inner reference point 308 of the lobe 330. As used herein, the term "straight portion" of a leading edge or a trailing edge refers to a portion of the leading edge or trailing edge defining a radius of curvature greater than two times the span of the respective LP stator vanes.

More particularly, the plurality of LP rotor blades 304 are coupled to the LP shaft 36 (FIG. 1) and rotate with the LP shaft 36. The plurality of LP rotor blades 304 include a radially inward platform 314 located at the root 310 and a radially outward platform 316 located at the tip 312. During operation of the gas turbine engine, the plurality of LP stator vanes 302 turn the flow direction of the combustion gases 66 (FIG. 1) that pass through the plurality of LP rotor blades 304.

The LP stator vane 302 further defines a leading edge reference line L that extends from where the leading edge 332 meets the root 326 to where the leading edge 332 meets the tip 328 and a trailing edge reference line T extending from where the trailing edge 334 meets the root 326 to where the trailing edge 334 meets the tip 328. The lobe 330 of FIG. 7 is configured as a leading edge lobe 309. The LP stator vane 302 may further include a trailing edge lobe 311 (depicted in phantom). The leading edge lobe 309 is positioned at the leading edge 332 and the trailing edge lobe 311 is positioned at the trailing edge 334. It should be appreciated that the turbine airfoil 302 may include the leading edge lobe 309, the trailing edge lobe 311, or a combination thereof.

More particularly, it should be appreciated that the leading edge lobe 309 may define a maximum axial height LH relative to the leading edge reference line L in a first direction, the trailing edge lobe 311 may define a maximum axial height TH relative to the trailing edge reference line T in a second direction. The first direction refers to a direction extending upstream and the second direction refers to a direction extending downstream.

Figure 8:
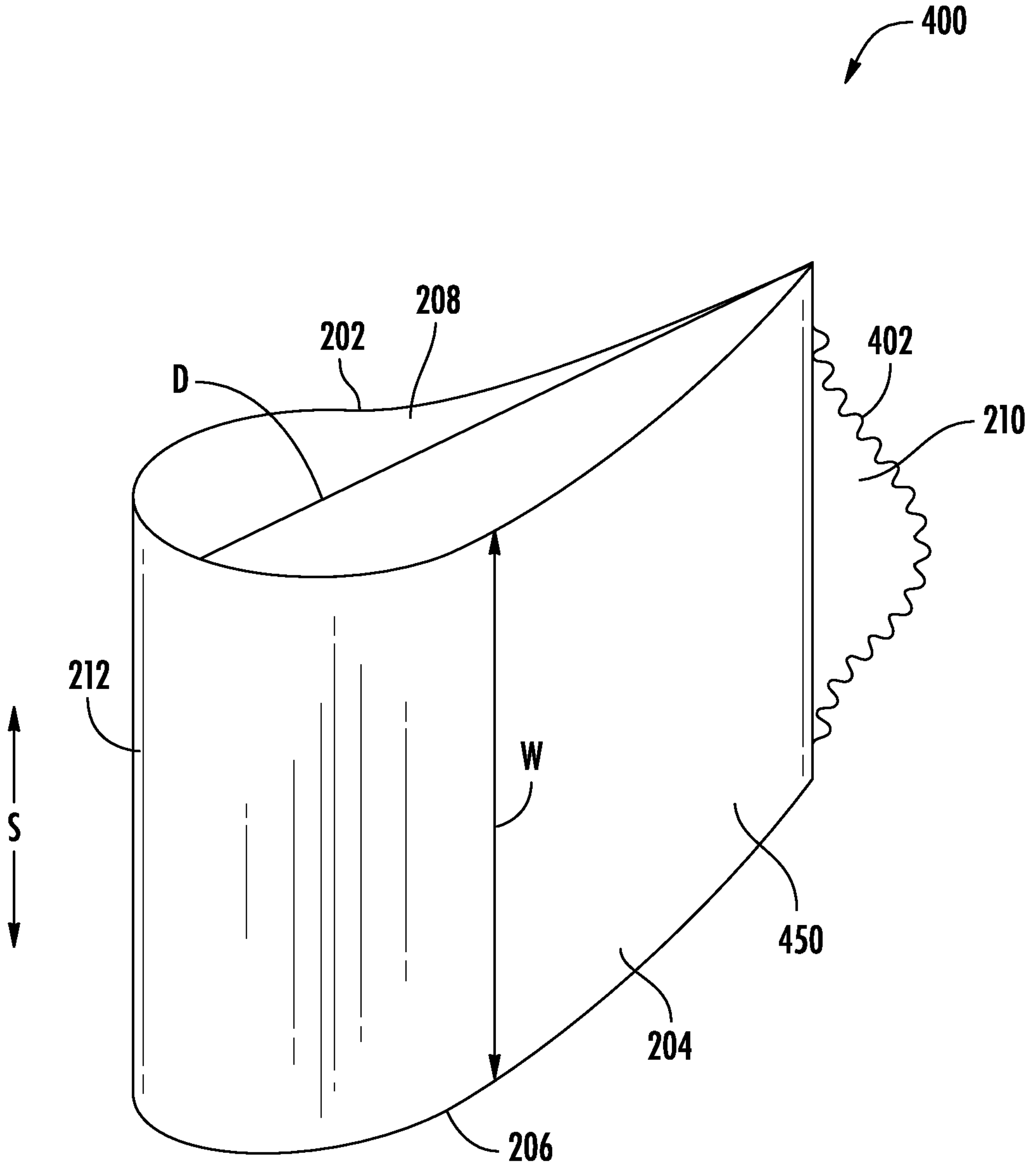
FIG. 8 is a schematic view of a turbine airfoil in accordance with another exemplary aspect of the present disclosure.

Referring now to FIG. 8, a schematic view of a turbine airfoil 400 in accordance with another exemplary aspect of the present disclosure is provided. The exemplary turbine airfoil 400 of FIG. 8 may be configured in substantially the same manner as the exemplary turbine airfoil 200 of FIG. 3, and accordingly, the same or similar numbers may refer to same or similar parts.

For example, the exemplary turbine airfoil 400 of FIG. 8 generally defines a camber direction D, a spanwise direction S, a span along the spanwise direction S, and a midpoint along the spanwise direction S. More specifically, the turbine airfoil 400 includes a pressure side 202, a suction side 204, a root 206, a tip 208, and a lobe 210. The pressure side 202 and the suction side 204 intersect at a leading edge 212 and a trailing edge 214. The root 206 and the tip 208 are at opposing ends of the turbine airfoil 400 along the spanwise direction S. The lobe 210 is positioned at the trailing edge 214 of the turbine airfoil 400. For the embodiment of FIG. 8, turbine airfoil 400 is a vane 450. Further, the lobe 210 includes a plurality of lobe features 402 along the span of the vane 450. The lobe features 402 refer to a plurality of extensions having a local height less than 20% of the maximum axial height of the lobe 210. Additionally, the lobe features 402 extend along the trailing edge between outer and inner reference points.

Further aspects are provided by the subject matter of the following clauses:

A turbine airfoil defining a chord line, a spanwise direction, a span along the spanwise direction, and a midpoint along the spanwise direction, the turbine airfoil comprising; a pressure side and a suction side, the pressure side and the suction side intersecting at a leading edge and a trailing edge; a root and a tip at opposing ends along the spanwise direction, the turbine airfoil defining a leading edge reference line extending from where the leading edge meets the root to where the leading edge meets the tip and a trailing edge reference line extending from where the trailing edge meets the root to where the trailing edge meets the tip; and a lobe positioned at the leading edge or the trailing edge and defining a maximum axially height relative to the leading edge reference line or the trailing edge reference line, the maximum axial height being equal to at least five percent of the chord line of the turbine airfoil.

The turbine airfoil of any preceding clause, wherein the turbine airfoil is a high pressure turbine nozzle, a low pressure turbine vane, or a turbine vane strut.

The turbine airfoil of any preceding clause, wherein the lobe comprises a lobe edge, and wherein the lobe comprises an upper inflection point, a lobe peak locating point, and a lower inflection point that define the lobe edge.

The turbine airfoil of any preceding clause, wherein the lobe peak locating point is located between at least 20% of the span of the turbine airfoil and up to 80% of the span of the turbine airfoil, wherein the upper inflection point is located between the lobe peak locating point and up to 90% of the span of the turbine airfoil, and wherein the lower inflection point is located between the lobe peak locating point and at least 10% of the span of the turbine airfoil.

The turbine airfoil of any preceding clause, wherein the maximum axial height of the lobe is defined at the lobe peak locating point.

The turbine airfoil of any preceding clause, wherein the turbine airfoil is a low pressure turbine vane, wherein the lobe defines an outer reference point and an inner reference point at opposing ends of the lobe along the spanwise direction, and wherein the inner reference point is at or above the midpoint.

The turbine airfoil of any preceding clause, wherein the turbine airfoil includes a straight portion on the leading edge or the trailing edge, and wherein the straight portion extends from the root to the inner reference point.

The turbine airfoil of any preceding clause, wherein the lobe is a leading edge lobe, and wherein the turbine airfoil further comprises: a trailing edge lobe, wherein the leading edge lobe is positioned at the leading edge, and wherein the trailing edge lobe is positioned at the trailing edge.

The turbine airfoil of any preceding clause, wherein the leading edge lobe defines a maximum axial height relative to the leading edge reference line in a first direction, wherein the trailing edge lobe defines a maximum axial height relative to the trailing edge reference line in a second direction, and wherein the first direction extends upstream and the second direction extends downstream.

The turbine airfoil of any preceding clause, wherein the turbine airfoil is a vane defining a span, and wherein the lobe is at the trailing edge, and wherein the lobe comprises a plurality of lobe features along the span of the vane.

The turbine airfoil of any preceding clause, wherein the lobe features comprise a plurality of extensions having a local height less than 20% of the maximum axial height of the lobe.

The turbine airfoil of any preceding clause, wherein the lobe features extend along the trailing edge between the outer reference point and the inner reference point of the lobe.

A gas turbine engine comprising; a turbomachine having a compressor section and a turbine section in serial flow order, the turbine section having a turbine airfoil defining a circumferential direction, a spanwise direction, and a span along the spanwise direction, the turbine airfoil comprising; a pressure side and a suction side, the pressure side and the suction side intersecting at a leading edge and a trailing edge; a root and a tip at opposing ends along the spanwise direction, the turbine airfoil defining a leading edge reference line extending from where the leading edge meets the root to where the leading edge meets the tip and a trailing edge reference line extending from where the trailing edge meets the root to where the trailing edge meets the tip; and a lobe positioned at the leading edge or the trailing edge and defining a maximum axial height relative to the leading edge reference line or the trailing edge reference line, the maximum axial height being equal to at least five percent of the span of the turbine airfoil.

The gas turbine engine of any preceding clause, wherein the turbine airfoil is a high pressure turbine nozzle, a low pressure turbine vane, or a turbine vane strut.

The gas turbine engine of any preceding clause, wherein the lobe comprises a lobe edge, and wherein the lobe comprises an upper inflection point, a lobe peak locating point, and a lower inflection point that define the lobe edge.

The gas turbine engine of any preceding clause, wherein the lobe peak locating point is located between at least 20% of the span of the turbine airfoil and up to 80% of the span of the turbine airfoil, wherein the upper inflection point is located between the lobe peak locating point and up to 90% of the span of the turbine airfoil, and wherein the lower inflection point is located between the lobe peak locating point and at least 10% of the span of the turbine airfoil.

The gas turbine engine of any preceding clause, wherein the maximum axial height of the lobe is defined at the lobe peak locating point.

The gas turbine engine of any preceding clause, wherein the turbine airfoil is a low pressure turbine vane, wherein the lobe defines an outer reference point and an inner reference point at opposing ends of the lobe along the spanwise direction, and wherein the inner reference point is at or above the midpoint.

The gas turbine engine of any preceding clause, wherein the turbine airfoil includes a straight portion on the leading edge or the trailing edge, and wherein the straight portion extends from the root to the lower inflection point.

The gas turbine engine of any preceding clause, wherein the lobe is a leading edge lobe, and wherein the turbine airfoil further comprises: a trailing edge lobe, wherein the leading edge lobe is positioned at the leading edge, and wherein the trailing edge lobe is positioned at the trailing edge.

The gas turbine engine of any preceding clause, wherein the leading edge lobe defines a maximum axial height relative to the leading edge reference line in a first direction, wherein the trailing edge lobe defines a maximum axial height relative to the trailing edge reference line in a second direction, and wherein the first direction extends upstream and the second direction extends downstream.

The gas turbine engine of any preceding clause, wherein the turbine airfoil is a vane defining a span, and wherein the lobe is at the trailing edge, and wherein the lobe comprises a plurality of lobe features along the span of the vane.

The gas turbine engine of any preceding clause, wherein the lobe features comprise a plurality of extensions having a local height less than 20% of the maximum axial height of the lobe.

The gas turbine engine of any preceding clause, wherein the lobe features extend along the trailing edge between the outer reference point and the inner reference point of the lobe.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine airfoil defining a chord line, a spanwise direction, a span along the spanwise direction, and a midpoint along the spanwise direction, the turbine airfoil comprising;

- a pressure side and a suction side, the pressure side and the suction side intersecting at a leading edge and a trailing edge;
- a root and a tip at opposing ends along the spanwise direction, the turbine airfoil defining a leading edge reference line extending from where the leading edge meets the root to where the leading edge meets the tip and a trailing edge reference line extending from where the trailing edge meets the root to where the trailing edge meets the tip; and
- a lobe positioned at the leading edge or the trailing edge and defining a maximum axial height relative to the leading edge reference line or the trailing edge reference line, the maximum axial height being equal to at least five percent of the chord line of the turbine airfoil, wherein the lobe comprises a lobe edge, an upper inflection point, a lobe peak locating point, and a lower inflection point that define a shape of the lobe edge, wherein the lobe is asymmetrical, and wherein the maximum axial height is located below the midpoint of the turbine airfoil.

2. The turbine airfoil of claim 1, wherein the turbine airfoil is a high pressure turbine nozzle, a low pressure turbine vane, or a turbine vane strut.

3. The turbine airfoil of claim 1, wherein the lobe is configured to reduce an acceleration of a flow of gases flowing past the lobe edge of the turbine airfoil.

4. The turbine airfoil of claim 3, wherein the lobe peak locating point is located between at least 20% of the span of the turbine airfoil and up to 80% of the span of the turbine airfoil, wherein the upper inflection point is located between the lobe peak locating point and up to 90% of the span of the turbine airfoil, and wherein the lower inflection point is located between the lobe peak locating point and at least 10% of the span of the turbine airfoil.

5. The turbine airfoil of claim 3, wherein the maximum axial height of the lobe is defined at the lobe peak locating point.

6. The turbine airfoil of claim 1, wherein the turbine airfoil is a low pressure turbine vane, wherein the lobe defines an outer reference point and an inner reference point at opposing ends of the lobe along the spanwise direction.

7. The turbine airfoil of claim 6, wherein the turbine airfoil includes a straight portion on the leading edge or the trailing edge, and wherein the straight portion extends from the root to the inner reference point.

8. The turbine airfoil of claim 6, wherein the lobe is a leading edge lobe, and wherein the turbine airfoil further comprises:

a trailing edge lobe, wherein the leading edge lobe is positioned at the leading edge, and wherein the trailing edge lobe is positioned at the trailing edge.

9. The turbine airfoil of claim 8, wherein the leading edge lobe defines a leading edge lobe maximum axial height relative to the leading edge reference line in a first direction, wherein the trailing edge lobe defines a trailing edge lobe maximum axial height relative to the trailing edge reference line in a second direction, and wherein the first direction extends upstream and the second direction extends downstream, wherein the upper inflection point, the lobe peak locating point, and the lower inflection point are each positioned to define an axial offset from the trailing edge, wherein the leading edge lobe maximum axial height is located below the midpoint of the turbine airfoil, and wherein the trailing edge lobe maximum axial height is located below the midpoint of the turbine airfoil.

10. The turbine airfoil of claim 1, wherein the turbine airfoil is a vane defining a span, and wherein the lobe is at the trailing edge, and wherein the lobe comprises a plurality of lobe features along the span of the vane, wherein the leading edge is straight, and wherein the maximum axial height is equal to at least 25 percent of the chord line of the turbine airfoil.

11. A gas turbine engine comprising;

a turbomachine having a compressor section and a turbine section in serial flow order, the turbine section having a turbine airfoil defining a circumferential direction, a spanwise direction, a span along the spanwise direction, and a midpoint along the spanwise direction, the turbine airfoil comprising;

a pressure side and a suction side, the pressure side and the suction side intersecting at a leading edge and a trailing edge;

a root and a tip at opposing ends along the spanwise direction, the turbine airfoil defining a leading edge reference line extending from where the leading edge meets the root to where the leading edge meets the tip and a trailing edge reference line extending from where the trailing edge meets the root to where the trailing edge meets the tip; and a lobe positioned at the leading edge or the trailing edge and defining a maximum axial height relative to the leading edge reference line or the trailing edge reference line, the maximum axial height being equal to at least five percent of the span of the turbine airfoil, wherein the lobe comprises a lobe edge, an upper inflection point, a lobe peak locating point, and a lower inflection point that define a shape of the lobe edge, wherein the lobe is asymmetrical, and wherein the maximum axial height is located below the midpoint of the turbine airfoil.

12. The gas turbine engine of claim 11, wherein the turbine airfoil is a high pressure turbine nozzle, a low pressure turbine vane, or a turbine vane strut.

13. The gas turbine engine of claim 11, wherein the lobe is configured to reduce an acceleration of a flow of gases flowing past the lobe edge of the turbine airfoil.

14. The gas turbine engine of claim 13, wherein the lobe peak locating point is located between at least 20% of the span of the turbine airfoil and up to 80% of the span of the turbine airfoil, wherein the upper inflection point is located between the lobe peak locating point and up to 90% of the span of the turbine airfoil, and wherein the lower inflection point is located between the lobe peak locating point and at least 10% of the span of the turbine airfoil.

15. The gas turbine engine of claim 13, wherein the maximum axial height of the lobe is defined at the lobe peak locating point.

16. The gas turbine engine of claim 11, wherein the turbine airfoil is a low pressure turbine vane, wherein the lobe defines an outer reference point and an inner reference point at opposing ends of the lobe along the spanwise direction.

17. The turbine airfoil of claim 16, wherein the turbine airfoil includes a straight portion on the leading edge or the trailing edge, and wherein the straight portion extends from the root to the lower inflection point.

18. The turbine airfoil of claim 16, wherein the lobe is a leading edge lobe, and wherein the turbine airfoil further comprises:

a trailing edge lobe, wherein the leading edge lobe is positioned at the leading edge, and wherein the trailing edge lobe is positioned at the trailing edge.

19. The gas turbine engine of claim 18, wherein the leading edge lobe defines a leading edge lobe maximum axial height relative to the leading edge reference line in a first direction, wherein the trailing edge lobe defines a trailing edge lobe maximum axial height relative to the trailing edge reference line in a second direction, and wherein the first direction extends upstream and the second direction extends downstream, wherein the leading edge lobe maximum axial height is located below the midpoint of the turbine airfoil, and wherein the trailing edge lobe maximum axial height is located below the midpoint of the turbine airfoil.

20. The gas turbine engine of claim 11, wherein the turbine airfoil is a vane defining a span, and wherein the lobe is at the trailing edge, and wherein the lobe comprises a plurality of lobe features along the span of the vane, wherein the leading edge is straight, and wherein the maximum axial height is equal to at least 25 percent of the span of the turbine airfoil.

* * * * *